United States Patent
He et al.

(10) Patent No.: US 12,361,287 B2
(45) Date of Patent: *Jul. 15, 2025

(54) DATA RETRIEVAL USING REINFORCED CO-LEARNING FOR SEMI-SUPERVISED RANKING

(71) Applicant: Snap Inc., Santa Monica, CA (US)

(72) Inventors: Shibi He, Urbana, IL (US); Yanen Li, Los Angeles, CA (US); Ning Xu, Irvine, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,330

(22) Filed: Dec. 18, 2023

(65) Prior Publication Data

US 2024/0127064 A1 Apr. 18, 2024

Related U.S. Application Data

(63) Continuation of application No. 17/972,459, filed on Oct. 24, 2022, now Pat. No. 11,893,489, which is a continuation of application No. 16/448,749, filed on Jun. 21, 2019, now Pat. No. 11,544,553.

(51) Int. Cl.
*G06N 3/08* (2023.01)
*G06F 18/20* (2023.01)
*G06F 18/24* (2023.01)
*G06N 3/045* (2023.01)

(52) U.S. Cl.
CPC .............. *G06N 3/08* (2013.01); *G06F 18/24* (2023.01); *G06F 18/295* (2023.01); *G06N 3/045* (2023.01)

(58) Field of Classification Search
CPC .............................. G06F 18/24; G06F 18/295
See application file for complete search history.

(56) References Cited

U.S. PATENT DOCUMENTS

| | | | |
|---|---|---|---|
| 10,885,906 B2 | 1/2021 | Steedman Henderson et al. | |
| 11,544,553 B1* | 1/2023 | He | .................. G06F 18/295 |
| 11,893,489 B2* | 2/2024 | He | ...................... G06N 3/08 |
| 2015/0164377 A1 | 6/2015 | Nathan et al. | |
| 2017/0140053 A1 | 5/2017 | Vorobev et al. | |
| 2023/0053009 A1 | 2/2023 | He et al. | |

OTHER PUBLICATIONS

U.S. Appl. No. 16/448,749, filed Jun. 21, 2019, U.S. Pat. No. 11,544,553, Data Retrieval Using Reinforced Co-Learning For Semi-Supervised Ranking.

U.S. Appl. No. 17/972,459, filed Oct. 24, 2022, Data Retrieval Using Reinforced Co-Learning For Semi-Supervised Ranking.

(Continued)

*Primary Examiner* — Diane D Mizrahi
(74) *Attorney, Agent, or Firm* — SCHWEGMAN LUNDBERG & WOESSNER, P.A.

(57) ABSTRACT

A computer-implement method comprises: training a classifier with labeled data from a dataset; classifying, by the trained classifier, unlabeled data from the dataset; providing, by the classifier to a policy gradient, a reward signal for each data/query pair; transferring, by the classifier to a ranker, learning; training, by the policy gradient, the ranker; ranking data from the dataset based on a query; and retrieving data from the ranked data in response to the query.

17 Claims, 7 Drawing Sheets

(56) References Cited

OTHER PUBLICATIONS

"U.S. Appl. No. 16/448,749, 312 Amendment filed Oct. 26, 2022", 3 pgs.
"U.S. Appl. No. 16/448,749, Non Final Office Action mailed May 6, 2022", 11 pgs.
"U.S. Appl. No. 16/448,749, Notice of Allowance mailed Aug. 8, 2022", 5 pgs.
"U.S. Appl. No. 16/448,749, PTO Response to Rule 312 Communication mailed Oct. 27, 2022", 3 pgs.
"U.S. Appl. No. 16/448,749, PTO Response to Rule 312 Communication mailed Nov. 3, 2022", 2 pgs.
"U.S. Appl. No. 16/448,749, PTO Response to Rule 312 Communication mailed Nov. 17, 2022", 2 pgs.
"U.S. Appl. No. 16/448,749, PTO Response to Rule 312 Communication mailed Nov. 28, 2022", 2 pgs.
"U.S. Appl. No. 16/448,749, Response filed Jun. 27, 2022 to Non Final Office Action mailed May 6, 2022", 6 pgs.
"U.S. Appl. No. 17/972,459, Non Final Office Action mailed Jun. 22, 2023", 10 pgs.
"U.S. Appl. No. 17/972,459, Notice of Allowance mailed Sep. 20, 2023", 5 pgs.
"U.S. Appl. No. 17/972,459, Response filed Aug. 24, 2023 to Non Final Office Action mailed Jun. 22, 2023", 6 pgs.

\* cited by examiner

DATA RETRIEVAL USING REINFORCED CO-LEARNING FOR SEMI-SUPERVISED RANKING

PRIORITY CLAIM

This application is a continuation of and claims the benefit of priority of U.S. patent application Ser. No. 17/972,459, filed Oct. 24, 2022, which is a continuation of and claims the benefit of priority of U.S. patent application Ser. No. 16/448,749, filed Jun. 21, 2019, which are hereby incorporated by reference in their entireties.

TECHNICAL FIELD

An embodiment of the present subject matter relates generally to machine learning and, more specifically, to data retrieval using reinforced co-learning for semi-supervised ranking.

BACKGROUND

A ranking is a relationship between a set of items such that items are ranked higher, lower or equal to other items. By reducing detailed measures to a sequence of numbers, rankings make it possible evaluate complex information according to one or more criteria. For example, an Internet search engine may rank webpages based on estimated relevance. In another example, a database may retrieve files based on relevance to a query.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
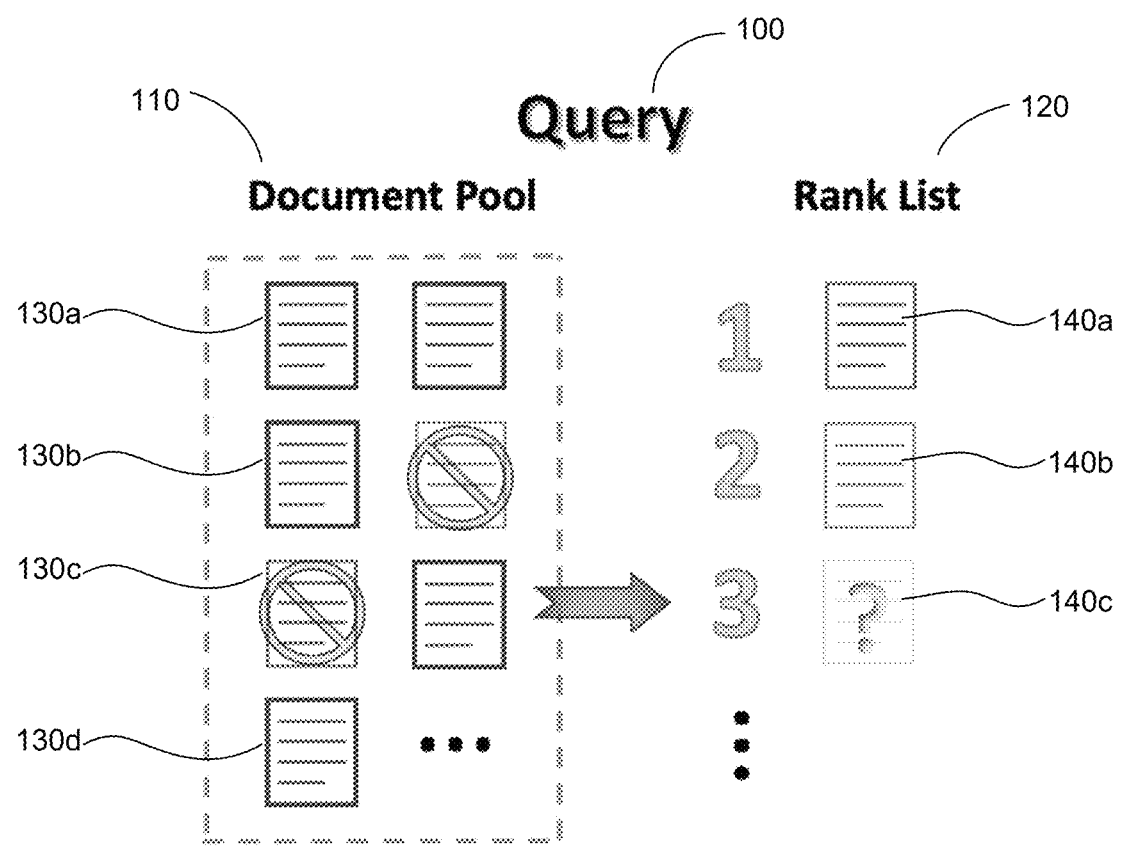
FIG. 1 shows an example system configuration, wherein a ranker generates a ranked list from a document pool.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for data retrieval system using reinforced co-learning for semi-supervised ranking. The system in one example embodiment has two modules: a classifier module and a reinforcement ranker module. Given a query, the classifier module is trained to classify whether a document is relevant or not. The reinforcement ranker module is trained to give relevance scores on the basis of treating ranking problems as Markov decision processes (MDP). The system uses "reinforced co-learning" because the two modules are iteratively optimized and affect each other while training. When training the classifier module, the reinforcement module gives every candidate a relevance score and sample lower scored documents as irrelevant samples (negative samples). Likewise, in order to train the reinforcement ranker module, the classifier module predicts labels in the sequence in order to calculate the combined rewards. The linkage between the two modules is also reflected in the network structure. The system in some embodiments includes a feature sharing layer, which enables the classifier to distill its intermediate representations to the learning of the reinforcement ranker module. Extensive experiments and ablation studies show that both co-learning strategy and feature sharing can improve semi-supervised ranking problems.

The system uses a reinforcement learning method that can leverage the direct optimization of ranking scores and the learning of a large amount of unlabeled data at the same time. The construction of a document ranking list would be considered as sequential decision making (?), where each time step corresponds to a ranking position and each action is to select a document for its current position. Given the query, the classifier is trained to determine the predicted relevance of the retrieved document. In order to train the classifier, positive samples are chosen from the labeled set, and the negative data is sampled both from the labeled set and a distribution predicted by the reinforcement ranker module. The reinforcement ranker has input from the original feature space, and the other input is transferred from the classifier module. These intermediate features from the classifier can distill discriminative side information. The classifier module not only affects the input features by distillation, but also provides rewards for the training of the reinforcement ranker. The system uses the policy gradient method to train the reinforcement ranker. The reward is combined by two components: one is the normalized discounted cumulative gain (NDCG) score, and the other is the discriminative score output by the classifier module. This score reflects the accuracy with which the current retrieved list is related to the query.

The two modules are trained iteratively with the training algorithm that is discussed further below. In each step, the classifier would acquire more and more confident negative data, as the reinforcement ranker module becomes more and more accurate; the reinforcement ranker module is updated by the policy gradient function, given combined rewards and distilled features from the classifier module.

In summary, a classifier module and a reinforcement ranker module leverage the unlabeled data and learn to rank. An iterative training pipeline is used to train the co-learning framework. A combined reward helps the reinforcement ranker gain a better ranking performance. Knowledge distillation is deployed between the classifier and the reinforcement ranker. The classifier shares its intermediate representation as knowledge and passes it through to guide the training of the reinforcement ranker. This technique further improves the ranking performance.

FIG. 1 shows an example system configuration, wherein a ranker generates a ranked list from a document pool. For a given query 100, a ranker 220 (FIG. 2) generates a rank list 120 of documents 130a-d, etc. in a document pool 110. The ranked list 120 contains a ranking of relevant documents 140a, b, c, etc. The document pool may contain both labelled (130a, b, and d) and unlabeled documents (130c). As will be discussed further below, the process of document ranking can be shown as a Markov Decision Process (MDP). The construction of a document ranking list comprises sequential decision makings, where each time step corresponds to a ranking position and each action is to select a document for its current position.

Figure 2:
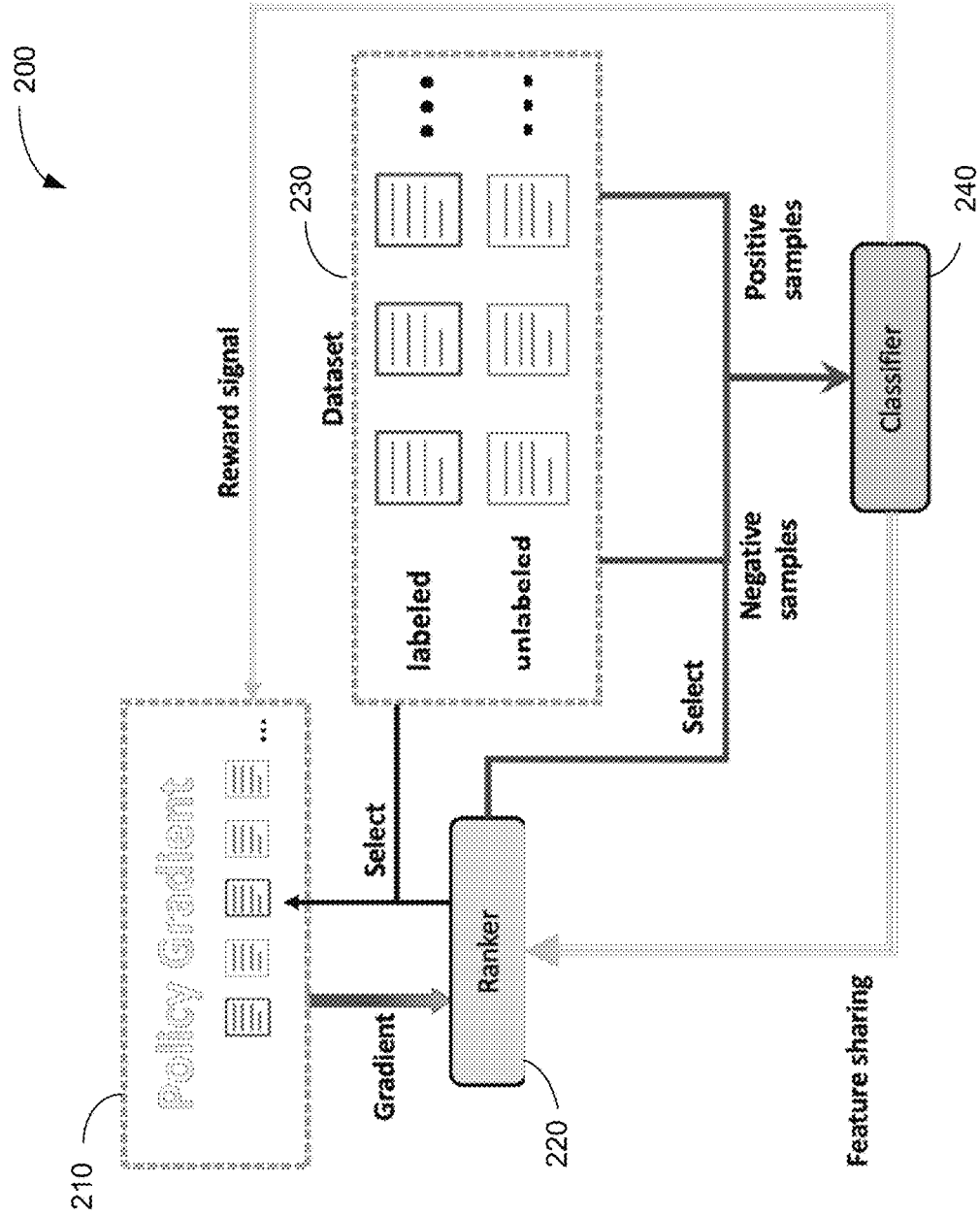
FIG. 2 is a block diagram of the ranking system, according to some example embodiments.

FIG. 2 is a block diagram of the ranking system 200, according to some example embodiments. To avoid obscuring the inventive subject matter with unnecessary detail, various functional components (e.g., components) that are not germane to conveying an understanding of the inventive subject matter have been omitted from FIG. 2. However, a skilled artisan will readily recognize that various additional functional components may be supported by the system 200 to facilitate additional functionality that is not specifically described herein. Furthermore, the various functional components depicted in FIG. 2 may reside on a single computing device or may be distributed across several computing devices in various arrangements such as those used in cloud-based architectures.

The system 200 comprises a ranker 220 and a classifier 240. Given the query 100, the classifier 240 is trained to determine the predicted relevance of the retrieved document. A dataset 230 comprises human labeled data, which may comprise, for example, 5%-70% of the data, and unlabeled data. The classifier 240 is trained based on the labeled data. Positive samples (e.g., labeled data) train the classifier 240 while negative samples, which can also come from labeled data, are drawn by the ranker 120. For the given query 100, the classifier 240 then labels the unlabeled data. The classifier 240 provides a reward signal to a policy gradient function 210 as well as an intermediate feature (transferred learning) to the ranker 220. The ranker 220 then optimizes its ranking by objective based on the policy gradient. The overall training pipeline is an iterative process. Every iteration comprises two training procedures: first the classifier, then the reinforcement ranker.

Figure 3:
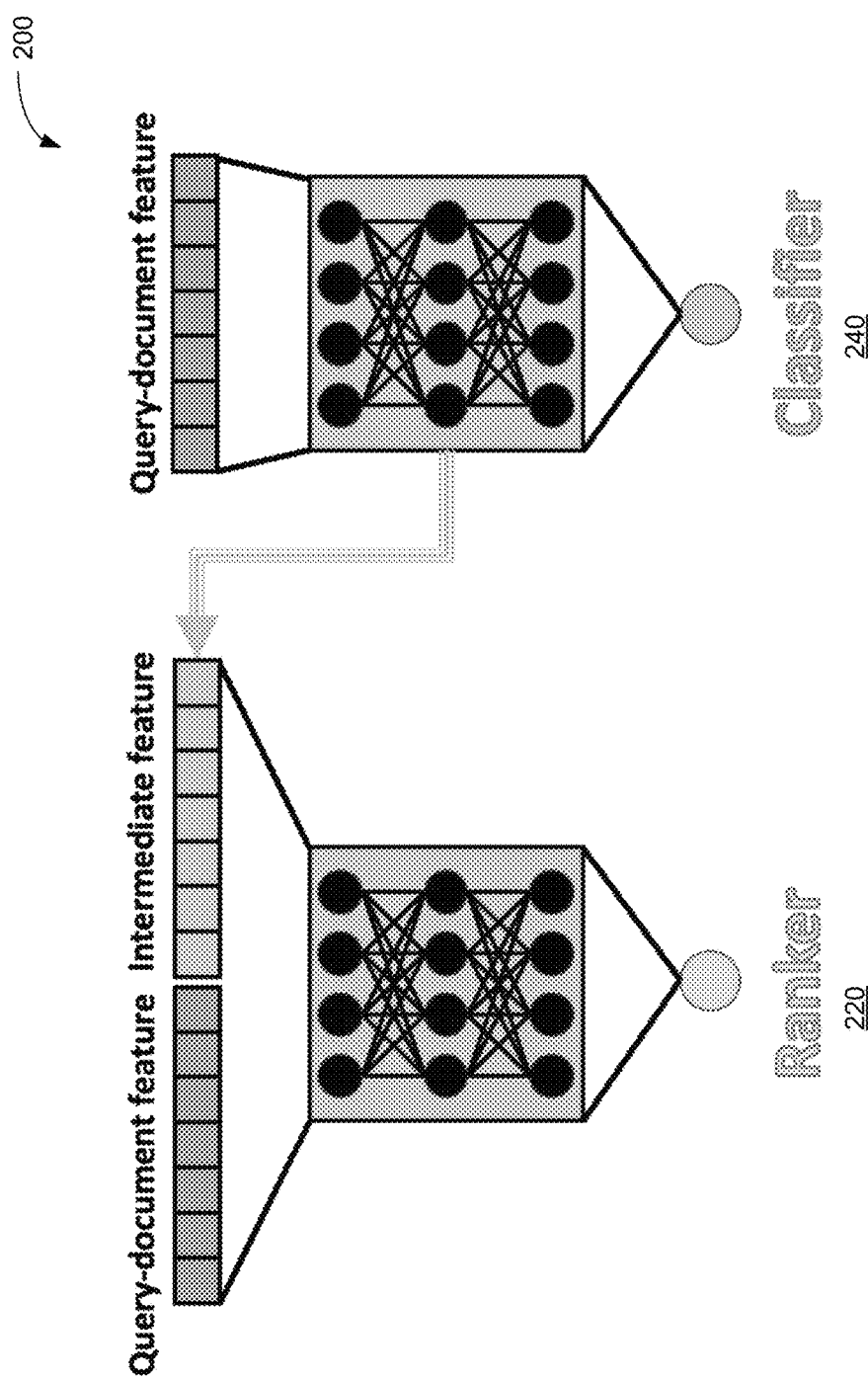
FIG. 3 is a block diagram of the ranking system according to some example embodiments.

FIG. 3 is a block diagram of the ranking system 200 according to some example embodiments. The ranker 220 and classifier 240 may be neural networks. θ denotes the reinforcement ranker's parameters and ϕ the classifier's.

In semi-supervised ranking settings, we are given N semi-labeled training data $\{q^{(n)}, X^{(n)}, Y^{(n)}\}^N$ n=1. For each query $q^{(n)}$, $X^{(n)} = \{x^{(n)}_1, \ldots, x^{(n)}_{Mn}\}$ and $Y^{(n)} = \{y^{(n)}_1, \ldots, y^{(n)}_{Mn}\}$ are query-document features and relevance labels for the retrieved documents, where Mn is the number of candidate documents retrieved by query q(n) and y represents labels. Given a query q(n), the system's 200 target is to retrieve a document list from X(n) to maximize ranking metrics, where more relevant documents are closer to the top of the ranking list.

The classifier module is a function $f_\phi(x,q)$ showed in FIG. 3 where ϕ is the parameter, q is the query and x is the query-document feature. Given a query and a document, $f_\phi(x,q)$ is the predicted relevance. The objective for the discriminator is to maximize the log-likelihood of correctly distinguishing the relevant and irrelevant document. The true relevant documents are sampled from the positively labeled training data $p_{true}(x|q^{(n)})$, while the negative samples are generated from the negatively labeled training data and low-scoring documents given by the reinforcement ranker $p_\theta^*(x|q^{(n)}, \phi^*_{old})$. $p_\theta^*(x|q^{(n)}, \phi^*_{old})$ will be discussed in detail referring to the Equation (5) below. Briefly, θ* is the current optimal reinforcement ranker and ϕ* old is the current optimal classifier.

As training is an iterative process, our new optimal ϕ* based on θ* and $\phi^*_{old}$ is obtained by:

$$\phi^* = \arg\max_\phi \sum_{n=1}^N \left( E_{x \sim p_{true}(x|q^{(n)})}[\log(\sigma(f_\phi(x, q^{(n)})))] + E_{x \sim p_{\theta^*}(x|q^{(n)}, \phi^*_{old})}[\log(1 - \sigma(f_\phi(x, q^{(n)})))] \right) \quad (1)$$

where σ is the Sigmoid function.

With respect to the ranker 220, State st ∈ S is the state in the ranking environment. Specifically, the agent should know the current ranking position and candidate documents. At the time step t, $s_t$ is represented as $\{t, X_t\}$, where the current ranking position is t and $X_t$ comprises the remaining documents to be retrieved.

Action $a_t \in A_t$ is to select a document as the ranking result at the step t. Since $X_t$ is the candidate documents pool, $A_t = X_t$.

Transition T:S×A→S maps the state-action pair to a new state. After choosing $a_t$, document $x_{(at)}$ is removed from $X_t$, where $x_{(at)}$ is the document chosen by $a_t$. Therefore:

$$T(\{t, X_t\}, a_t) = \{t+1, X_t \setminus x_{(a_t)}\}$$

Reward $R(s_t, a_t)$ is the immediate reward given by the environment. To optimize the quality of the ranker 220, the reward based on information retrieval evaluation metrics such as DCG. Accordingly, $R_{DCG}$ is defined as:

$$R_{DCG}(s_t, a_t) = \begin{cases} 2^{y(a_t)} - 1 & t = 0 \\ \dfrac{2^{y(a_t)} - 1}{\log_2^{(t+1)}} & t > 0 \end{cases} \quad (2)$$

where $y(a_t)$ is the relevance label of document $x(a_t)$. As some of the labels are unknown in the semi-supervised setting, we adopt the predicted label $\sigma(f_\phi^*(x(a_t), q))$ from the classifier as $y(a_t)$.

in each epoch of training, $\phi^*$ is trained to score down the possibly irrelevant documents and score up the likely relevant documents. The classifier's output can be the reward signal:

$$R_{CLS}(s_t,a_t) = f_\phi^*(x_{(a_t)}, q) \quad (3)$$

The final reward is a combined reward summing equation (2) and (3) together, then minus a baseline c which is a constant:

$$R(s_t, a_t) = R_{DCG}(s_t, a_t) + R_{CLS} - c. \quad (4)$$

Policy $\pi_\theta$ decides which document to choose at the current step t. It is a probabilistic distribution over all documents available. It is formally defined in Equation (6).

In order to share the classifier's intermediate representation to the reinforcement ranker 220, the classifier 240 passes the output of a hidden layer to the reinforcement ranker 220 ("sharing"). The feature shared by the classifier $\phi^*$ will be concatenated with the original document-query feature x, and together they serve as the reinforcement ranker's input. We define a probability distribution:

$$p_\theta(x \mid q, \phi^*) = \frac{\exp\{\mu_\theta(x, s(\phi^*), q)/\Delta\}}{\sum_{x \in X} \exp\{\mu_\theta(x, s(\phi^*), q)/\Delta\}} \quad (5)$$

where $\mu_\theta$ (x, s($\phi$)*),q) is the reinforcement ranker function presented in FIG. 3, s($\phi^*$) is the intermediate representation shared by the classifier 240 and $\Delta$ is a constant temperature. At the step t, our candidate pool is $X_t$, so we derive the policy as $$\pi_\theta(a_t \mid s_t) = \frac{\exp\{\mu_\theta(x_{(a_t)}, s(\phi^*), q)/\Delta\}}{\sum_{x \in X_t} \exp\{\mu_\theta(x, s(\phi^*), q)/\Delta\}}. \quad (6)$$

With respect to the policy gradient function 210, the policy gradient function 210 trains the ranker 220. The goal of the ranker 220 is to maximize the future expected cumulative rewards. The reward is a combined reward defined in Equation (4).

The goal is to improve the reinforcement ranker's 220 performance by maximizing the objective:

$$\theta^* = \arg\max_\theta U(\theta)$$

$$U(\theta) = \sum_\tau P(\tau; \theta) R(\tau)$$

where $\tau$ is a trajectory of state-action sequence $s_0$, $a_0, \ldots, s_T, a_T$ sampled by the reinforcement ranker 20, and $P(\tau; \theta)$ is the probability of trajectory $\tau$ under policy $\pi_\theta$. $R(\tau) = \sum_{t=0}^T R(s_t, a_t)$. According to the policy gradient algorithm, the gradient can be calculated:

$$\nabla U(\theta) = \nabla_\theta \sum_\tau P(\tau; \theta) R(\tau)$$

$$= \sum_\tau P(\tau; \theta) \frac{\nabla_\theta P(\tau; \theta)}{P(\tau; \theta)} R(\tau)$$

$$= \sum_\tau P(\tau; \theta) \nabla_\theta \log P(\tau; \theta) R(\tau)$$

One can approximate this expectation by Monte-Carlo sampling. If we sample m trajectories under policy $\pi_\theta$, $$\nabla U(\theta) \approx \frac{1}{m} \sum_{i=1}^m \nabla_\theta \log P(\tau^{(i)}; \theta) R(\tau^{(i)})$$

$$= \frac{1}{m} \sum_{i=1}^m \sum_{t=0}^T \nabla_\theta \log \pi_\theta(a_t^{(i)} \mid s_t^{(i)}) R_t$$

where $R_t = \sum_{k=t}^T R(s_k^{(i)}, a_k^{(i)})$.

We further sample each time step within each trajectory so that the gradient is calculated and estimated as $$\nabla U(\theta) \approx \nabla_\theta \log \pi_\theta(a^t \mid s_t) R_t \quad (7)$$

When training the classifier $\phi$, we keep $\theta^*$ and $\phi^*_{old}$ unchanged. It is because of negative sampling that training $\phi$ also requires $\theta^*$ and $\phi^*_{old}$. To generate negative samples, we need the current reinforcement ranker $\theta^*$, moreover, ranker 220 needs the old classifier $\phi^*$ old to provide it with intermediate features.

Then, we fix $\phi^*$ to train the reinforcement ranker $\theta$, which first samples a bunch of trajectories. Next, the policy gradient algorithm is then used. The reward signal given by the classifier $\phi^*$ is passed to this reinforcement learning environment. Finally, the gradient of $\phi^*$ is calculated and transferred to the ranker so that the ranker can do one step of parameter update.

An example algorithm of the system 200 is listed below:

| Algorithm 1 Reinforced Co-Learning |
| --- |
| Input: classifier $\phi$, reinforcement ranker $\theta$, semi-labeled dataset $\{q^{(n)}, X^{(n)}, Y^{(n)}\}_{n=1}^N$ |
| 1:    repeat |
| 2:       $\phi_{old}^* \leftarrow \phi$, $\theta^* \leftarrow \theta$ |
| 3:       for d-steps do |
| 4:          Use $p_\theta(x \mid q, \phi_{old}^*)$ to generate negative samples. |
| 5:          Other samples are from labeled data. |
| 6:          Update $\phi$ according to objective Eq. (1). |
| 7:       end for |
| 8:       $\phi^* \leftarrow \phi$ |
| 9:       for p-steps do |
| 10:         Sample ranking trajectories lunder policy $\pi_\theta(\alpha_t \mid s_t)$. |
| 11:         Compute and accumulate rewards $R_t$. |
| 12:         Update $\theta$ by policy gradient Eq. (7). |
| 13:       end for |
| 14:    until reinforcement ranker converges |

Figure 4:
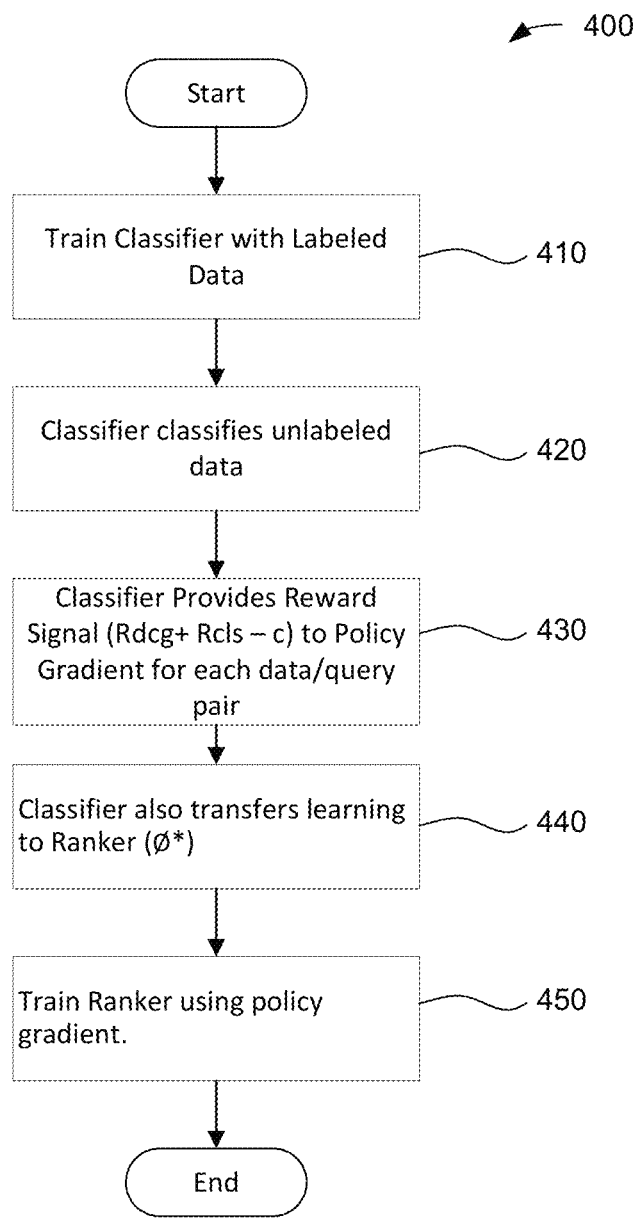
FIG. 4 is a flow chart illustrating a method of ranking according to some example embodiments.

FIG. 4 is a flow chart illustrating a method 400 of ranking according to some example embodiments. Note that the method 400 is iterative. First, the classifier 240 trains (410) with labeled data. The classifier 240 then classifies (420) or labels unlabeled data. The classifier 240 then provides (430) a reward signal to the policy gradient function 210 for each data (e.g., document)/query pair. Classifier 240 also transfers (440) learning (feature sharing) to the ranker 220. The ranker 220 is then trained (450) using the policy gradient function 210. The ranker 220 can then rank a set of data 230 and enable retrieval of top-ranked data, e.g., 140a, thereby enabling more efficient retrieval of desired data as will be discussed in conjunction with FIG. 7

Software Architecture

Figure 5:
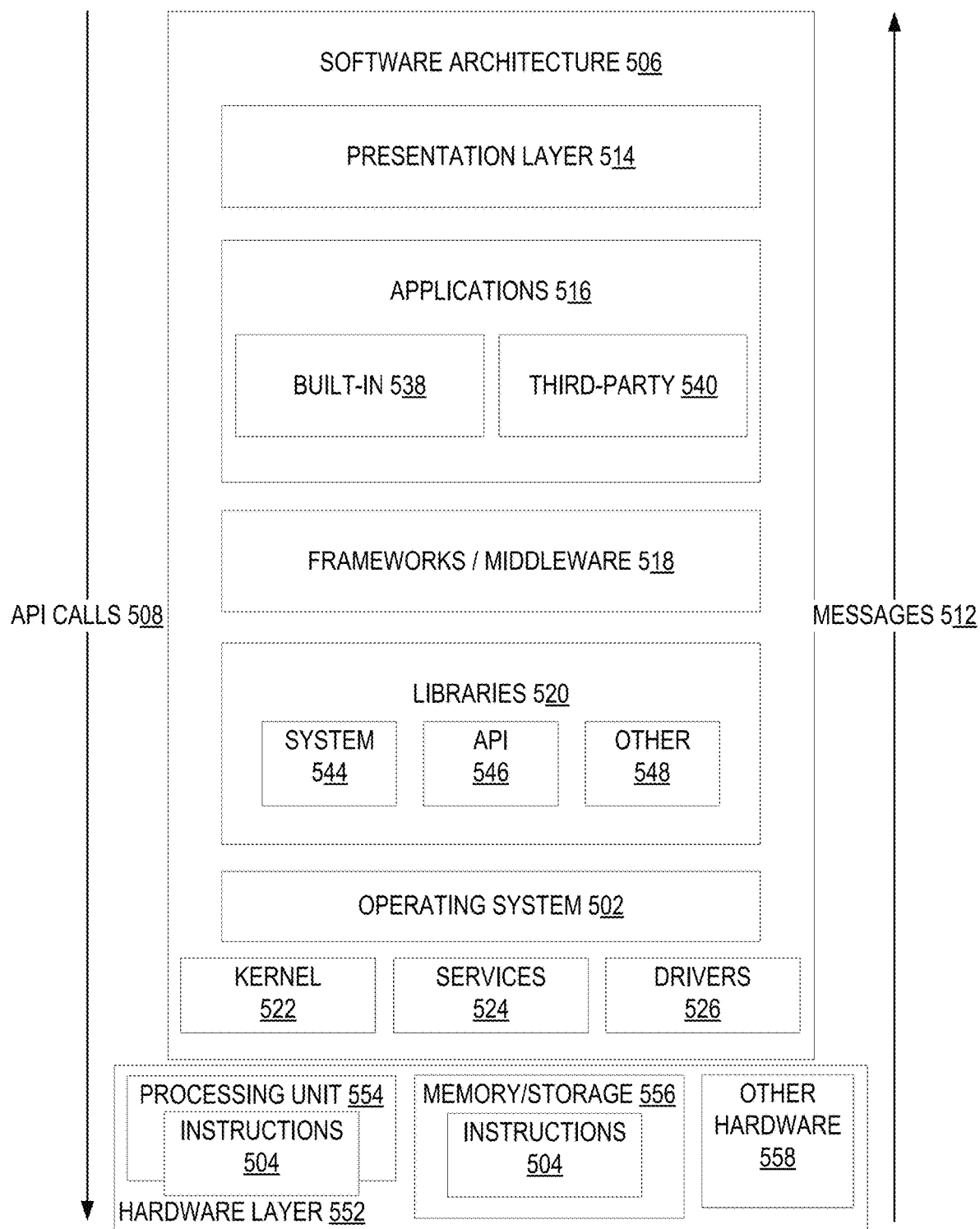
FIG. 5 is a block diagram illustrating a representative software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture 506 and it will be appreciated that many other architectures may be implemented to facilitate the functionality described herein. The software architecture 506 may execute on hardware such as machine 600 of FIG. 6 that includes, among other things, processors 604, memory 614, and (input/output) I/O components 618. A representative hardware layer 552 is illustrated and can represent, for example, the machine 600 of FIG. 6. The representative hardware layer 552 includes a processing unit 554 having associated executable instructions 504. Executable instructions 504 represent the executable instructions of the software architecture 506, including implementation of the methods, components, and so forth described herein. The hardware layer 552 also includes memory and/or storage modules memory/storage 556, which also have executable instructions 504. The hardware layer 552 may also comprise other hardware 558.

In the example architecture of FIG. 5, the software architecture 506 may be conceptualized as a stack of layers where each layer provides particular functionality. For example, the software architecture 506 may include layers such as an operating system 502, libraries 520, frameworks/middleware 518, applications 516, and a presentation layer 514. Operationally, the applications 516 and/or other components within the layers may invoke API calls 508 through the software stack and receive a response such as messages 512 in response to the API calls 508. The layers illustrated are representative in nature and not all software architectures have all layers. For example, some mobile or special purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 520 provide a common infrastructure that is used by the applications 516 and/or other components and/or layers. The libraries 520 provide functionality that allows other software components to perform tasks in an easier fashion than to interface directly with the underlying operating system 502 functionality (e.g., kernel 522, services 524 and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 (also sometimes referred to as middleware) provide a higher-level common infrastructure that may be used by the applications 516 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be used by the applications 516 and/or other software components/modules, some of which may be specific to a particular operating system 502 or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. Third-party applications 540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 540 may invoke the API calls 508 provided by the mobile operating system (such as operating system 502) to facilitate functionality described herein.

The applications 516 may use built in operating system functions (e.g., kernel 522, services 524 and/or drivers 526), libraries 520, and frameworks/middleware 518 to create user interfaces to interact with users of the system. Alternatively, or additionally, in some systems, interactions with a user may occur through a presentation layer, such as presentation layer 514. In these systems, the application/component "logic" can be separated from the aspects of the application/component that interact with a user.

Figure 6:
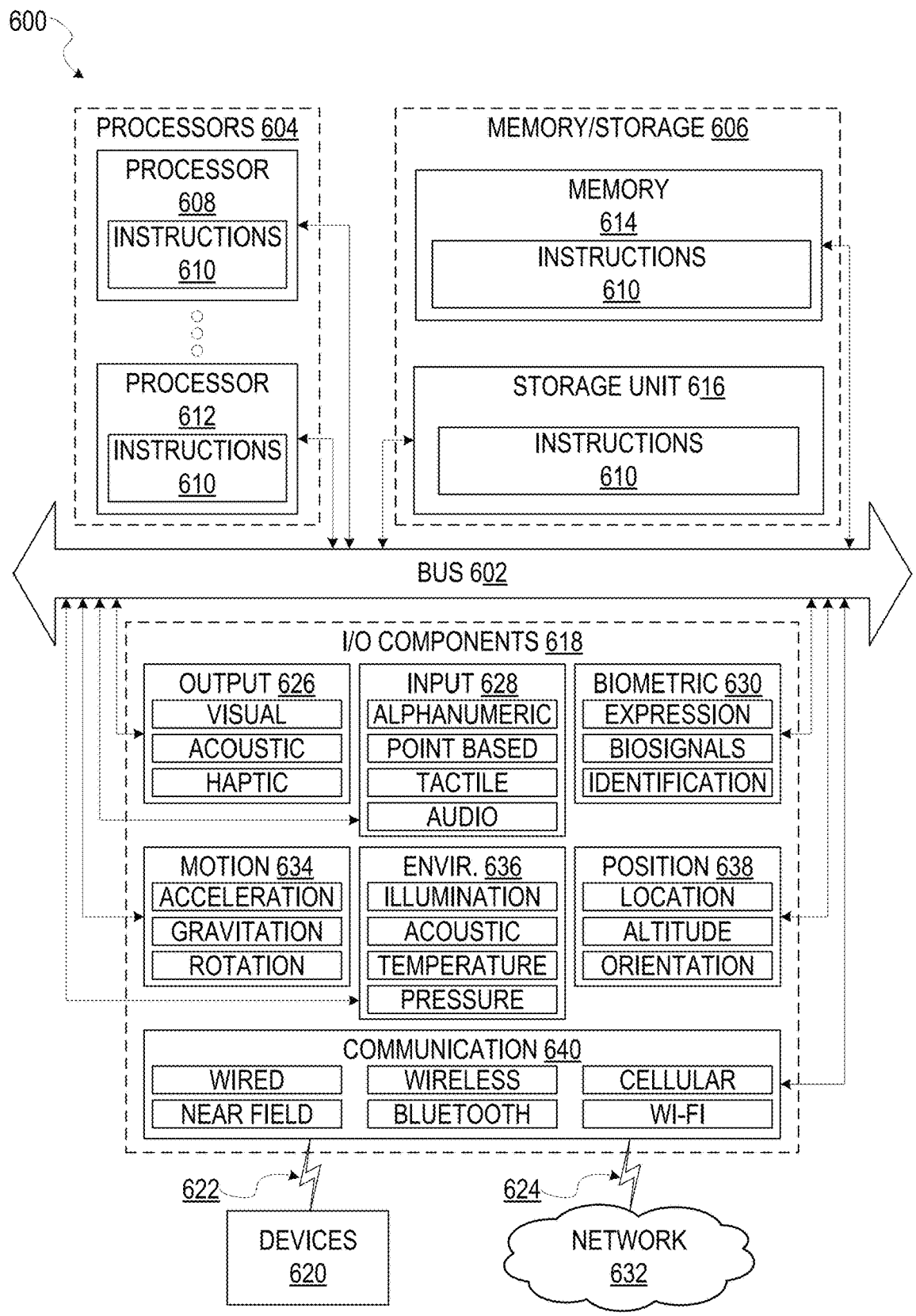
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 604 from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 600 capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 624 and coupling 622, respectively. For example, the communication components 640 may include a network interface component or other suitable device to interface with the network 632. In further examples, communication components 640 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as, location via Internet Protocol (IP) geo-location, location via Wi-Fi® signal triangulation, location via detecting a NFC beacon signal that may indicate a particular location, and so forth.

Figure 7:
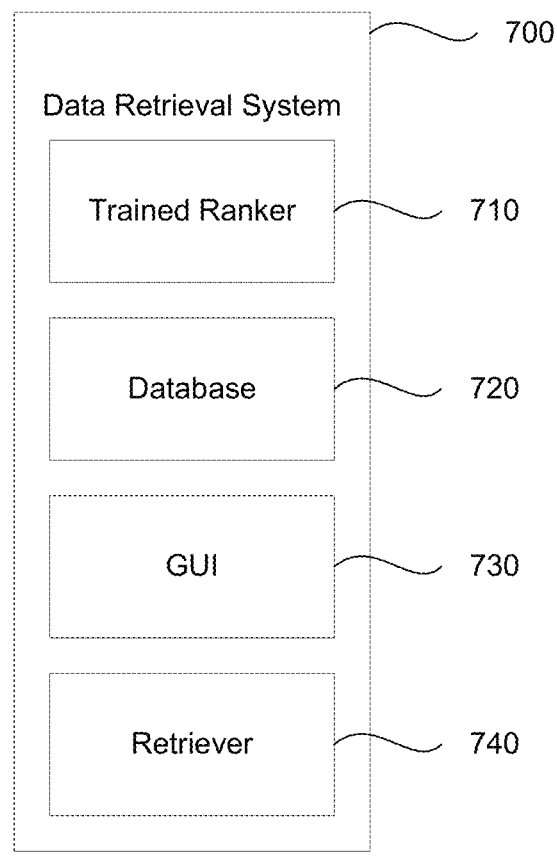
FIG. 7 is a block diagram illustrating a data retrieval system incorporating the ranking system of FIG. 2 and FIG. 3.

FIG. 7 is a block diagram illustrating a data retrieval system 700 incorporating the ranking system of FIG. 2 and FIG. 3. The system 700 includes a trained ranker 710 (e.g., the ranker 220 after training), a database 720 (e.g., of documents, electronic communications, such as emails, messages, etc., web page addresses, etc.), a graphical user interface (GUI) 730, and a retriever 740. After the ranker 220 is trainer, a user may enter a query for a data in the database 720 with the GUI 730. The trained ranker 710 then retrieves relevant ranked results and presents the results via the GUI 730. A user can then select the relevant data from the ranked results and the retriever 740 will retrieve the selected data (e.g., a message, webpage, documents, etc.). The selected data may be stored in the database 720 and/or in a remote device connected via communications network.

Glossary

"CARRIER SIGNAL" in this context refers to any intangible medium that is capable of storing, encoding, or carrying instructions 610 for execution by the machine 600, and includes digital or analog communications signals or other intangible medium to facilitate communication of such instructions 610. Instructions 610 may be transmitted or received over the network 632 using a transmission medium via a network interface device and using any one of a number of well-known transfer protocols.

"CLIENT DEVICE" in this context refers to any machine 600 that interfaces to a communications network 632 to obtain resources from one or more server systems or other client devices. A client device=may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 632.

"COMMUNICATIONS NETWORK" in this context refers to one or more portions of a network 632 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 632 or a portion of a network 632 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 610 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 610. The term "machine-readable medium" shall also be taken to include any medium, or combination of multiple media, that is capable of storing instructions 610 (e.g., code) for execution by a machine 600, such that the instructions 610, when executed by one or more processors 604 of the machine 600, cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 604) may be configured by software (e.g., an application 516 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 604 or other programmable processor 604. Once configured by such software, hardware components become specific machines 600 (or specific components of a machine 600) uniquely tailored to perform the configured functions and are no longer general-purpose processors 604. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 604 configured by software to become a special-purpose processor, the general-purpose processor 604 may be configured as respectively different special-purpose processors (e.g., comprising different hardware components) at different times. Software accordingly configures a particular processor or processors 604, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 602) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 604 that are temporarily configured (e.g., by software) or permanently configured to perform the relevant operations. Whether temporarily or permanently configured, such processors 604 may constitute processor-implemented components that operate to perform one or more operations or functions described herein. As used herein, "processor-implemented component" refers to a hardware component implemented using one or more processors 604. Similarly, the methods described herein may be at least partially processor-implemented, with a particular processor or processors 604 being an example of hardware. For example, at least some of the operations of a method may be performed by one or more processors 604 or processor-implemented components. Moreover, the one or more processors 604 may also operate to support performance of the relevant operations in a "cloud computing" environment or as a "software as a service" (SaaS). For example, at least some of the operations may be performed by a group of computers (as examples of machines 600 including processors 604), with these operations being accessible via a network 632 (e.g., the Internet) and via one or more appropriate interfaces (e.g., an API). The performance of certain of the operations may be distributed among the processors 604, not only residing within a single machine 600, but deployed across a number of machines 500. In some example embodiments, the processors 604 or processor-implemented components may be located in a single geographic location (e.g., within a home environment, an office environment, or a server farm). In other example embodiments, the processors 604 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 600. A processor 604 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 604 (sometimes referred to as "cores") that may execute instructions 610 contemporaneously.

EXAMPLES

1. A computer-implement method, comprising:
   training a classifier with labeled data from a dataset;
   classifying, by the trained classifier, unlabeled data from the dataset;
   providing iteratively, by the classifier to a policy gradient function, a reward signal for data/query pairs;
   transferring, by the classifier to a ranker, learning from the classifying;
   training, by the policy gradient function, the ranker;
   ranking, by the trained ranker, data from the dataset based on a query; and
   retrieving data from the ranked data in response to the query.
2. The method of example 1, wherein the classifier and ranker are neural networks.
3. The method of example 1, wherein the classifier is a neural network with feature sharing.
4. The method of example 3, wherein the transferred learning includes an intermediate feature.
5. The method of example 1, wherein the training the classifier is iterative.
6. The method of example 1, wherein the training the classifier uses both positive and negative samples from the dataset.
7. The method of example 1, wherein the negative samples further include negative classified data.
8. The method of example 1, wherein the ranking data is a Markov Decision Process.
9. The method of example 1, wherein the reward signal is a combination of a normalized discounted cumulative gain and a discriminative score output by the classifier.
10. A system, comprising:
    one or more processors of a machine;
    a memory storing instruction that, when executed by the one or more processors, cause the machine to perform operations comprising:
    training a classifier with labeled data from a dataset;
    classifying, by the trained classifier, unlabeled data from the dataset;
    providing iteratively, by the classifier to a policy gradient function, a reward signal for data/query pairs;
    transferring, by the classifier to a ranker, learning from the classifying;
    training, by the policy gradient function, the ranker;
    ranking, by the trained ranker, data from the dataset based on a query; and
    retrieving data from the ranked data in response to the query.
11. A machine-readable storage device embodying instructions that, when executed by a machine, cause the machine to perform operations comprising:

training a classifier with labeled data from a dataset;
classifying, by the trained classifier, unlabeled data from the dataset;
providing iteratively, by the classifier to a policy gradient function, a reward signal for data/query pairs;
transferring, by the classifier to a ranker, learning from the classifying;
training, by the policy gradient function, the ranker;
ranking, by the trained ranker, data from the dataset based on a query; and
retrieving data from the ranked data in response to the query.

12. The device of example 11, wherein the classifier and ranker are neural networks.

13. The device of example 11, wherein the classifier is a neural network with feature sharing.

14. The device of example 13, wherein the transferred learning includes an intermediate feature.

15. The device of example 11, wherein the training the classifier is iterative.

16. The device of example 11, wherein the training the classifier uses both positive and negative samples from the dataset.

17. The device of example 11, wherein the negative samples further include negative classified data.

18. The device of example 11, wherein the ranking data is a Markov Decision Process.

19. The device of example 11, wherein the reward signal is a combination of a normalized discounted cumulative gain and a discriminative score output by the classifier.

What is claimed is:

1. A computer-implemented method, comprising:
training a computer device classifier with labelled data and unlabeled data from a dataset;
providing, by the trained computer device classifier to a policy gradient function, a reward signal for data/query pairs based on the labelled and unlabeled data, wherein the reward signal is a combination of a normalized discounted cumulative gain and a discriminative score output by the trained computer device classifier;
transferring, by the trained computer device classifier to a ranker, learning from the trained computer device classifier;
providing, by the policy gradient function, a gradient based on the reward signal to the ranker to improve ranking;
ranking, by the ranker, data from the dataset based on a query including predicted relevance;
receiving a user selection of the ranked data; and
retrieving the user selected ranked data from a remote computer device.

2. The method of claim 1, wherein the ranker includes a neural network.

3. The method of claim 1, wherein the trained computer device classifier includes feature sharing.

4. The method of claim 3, wherein the transferred learning includes an intermediate feature.

5. The method of claim 1, wherein the training the computer device classifier comprises iteratively training with labeled data from the dataset.

6. The method of claim 5, wherein the training the computer device classifier comprises using both positive and negative samples from the dataset.

7. The method of claim 6, wherein the negative samples include negative classified data.

8. The method of claim 1, wherein the ranking the data from the dataset based on the query comprises a Markov Decision Process.

9. A machine-readable storage device embodying instructions that, when executed by a machine, cause the machine to perform operations comprising:
one or more processors of a machine;
a memory storing instruction that, when executed by the one or more processors, cause the machine to perform operations comprising:
training a computer device classifier with labelled data and unlabeled data from a dataset;
providing iteratively, by the trained computer device classifier to a policy gradient function, a reward signal for data/query pairs based on the labelled and unlabeled data, wherein the reward signal is a combination of a normalized discounted cumulative gain and a discriminative score output by the trained computer device classifier;
transferring, by the trained computer device classifier to a ranker, learning from the trained computer device classifier;
providing, by the policy gradient function, a gradient based on the reward signal to the ranker to improve ranking;
ranking, by the ranker, data from the dataset based on a query including predicted relevance
receiving a user selection of the ranked data; and
retrieving the user selected ranked data from a remote computer device.

10. A system, comprising:
one or more processors of a machine;
a memory storing instruction that, when executed by the one or more processors, cause the machine to perform operations comprising:
training a computer device classifier with labelled data and unlabeled data from a dataset;
providing, by the trained computer device classifier to a policy gradient function, a reward signal for data/query pairs based on the labelled and unlabeled data, wherein the reward signal is a combination of a normalized discounted cumulative gain and a discriminative score output by the trained computer device classifier;
transferring, by the trained computer device classifier to a ranker, learning from the trained computer device classifier;
providing, by the policy gradient function, a gradient based on the reward signal to the ranker to improve ranking;
ranking, by the ranker, data from the dataset based on a query including predicted relevance
receiving a user selection of the ranked data; and
retrieving the user selected ranked data from a remote computer device.

11. The system of claim 10, wherein the classifier and ranker are neural networks.

12. The system of claim 10, wherein the computer device classifier is a neural network with feature sharing.

13. The system of claim 12, wherein the transferred learning includes an intermediate feature.

14. The system of claim 10, wherein the the training the computer device classifier comprises iteratively training with labeled data from the dataset.

15. The system of claim 14, wherein the training the computer device classifier comprises using both positive and negative samples from the dataset.

16. The system of claim 15, wherein the negative samples include negative classified data.

17. The system of claim 10, wherein the ranking the data from the dataset based on the query comprises a Markov Decision Process.

* * * * *